United States Patent [19]

Dey et al.

[11] E Re. 31,414

[45] Reissued Oct. 11, 1983

[54] ELECTROLYTE SALTS FOR NON AQUEOUS ELECTROCHEMICAL CELLS

[75] Inventors: Arabinda N. Dey, Needham; John S. Miller, Charlestown, both of Mass.; William L. Bowden, Nashua, N.H.

[73] Assignee: Duracell Inc., Bethel, Conn.

[21] Appl. No.: 199,160

[22] Filed: Oct. 21, 1980

Related U.S. Patent Documents

Reissue of:

[64] Patent No.: 4,177,329
Issued: Dec. 4, 1979
Appl. No.: 956,833
Filed: Nov. 2, 1978

[51] Int. Cl.[3] ..... H01M 10/36
[52] U.S. Cl. ..... 429/101; 429/196
[58] Field of Search ..... 429/101, 194, 195, 196

[56] References Cited

U.S. PATENT DOCUMENTS

| | | | |
|---|---|---|---|
| 3,926,669 | 12/1975 | Auborn | 429/196 |
| 4,060,674 | 11/1977 | Klemann et al. | 429/194 |
| 4,071,664 | 1/1978 | Dey | 429/194 |
| 4,074,019 | 2/1978 | Malachesky et al. | 429/191 |
| 4,075,397 | 2/1978 | Francis et al. | 429/191 |
| 4,117,213 | 9/1978 | Whitney et al. | 429/194 |

*Primary Examiner*—Donald L. Walton
*Attorney, Agent, or Firm*—Ronald S. Cornell; Israel Nissenbaum

[57] ABSTRACT

Novel electrolyte salts having high current carrying capability for non-aqueous electrochemical cells particularly those containing fluid depolarizer/electrolyte solvents. The salts have the general formula $M(ZX_4)_n$ with "M" being an alkali or alkaline earth metal, "Z" being gallium, [indium or thallium,] "X" being a halogen and "n" being either 1 or 2.

9 Claims, No Drawings

ELECTROLYTE SALTS FOR NON AQUEOUS ELECTROCHEMICAL CELLS

Matter enclosed in heavy brackets [ ] appears in the original patent but forms no part of this reissue specification; matter printed in italics indicates the additions made by reissue.

This invention relates to electrolyte salts for electrochemical cells particularly non-aqueous high energy density cells and more particularly inorganic cells having fluid depolarizers such as thionyl chloride.

Recently much effort has been expended in the development of high energy density cell systems which provide both higher voltages and total capacity (volumetric and gravimetric) than those of the Leclanche or alkaline cells having zinc anodes. The high energy density cell systems are centered around the use of active metals (metals above hydrogen in the EMF series which are unstable in aqueous environments) as anodes in non-aqueous solution cells. Lithium in particular has shown great promise as an anode material because of its high potential and low weight.

Various cell systems have been developed utilizing lithium as the anode electrode material. The ones showing the most promise in terms of voltage stability and high discharge capability, are those having fluid cathode depolarizers which serve the dual function of electrolyte salt solvent and cathode depolarizer. When a cell of this type is not being discharged, the fluid depolarizer/electrolyte solvent reacts with the anode metal to a limited extent with a protective coating being formed on the surface of the anode. Full reaction between the anode and fluid depolarizer with which it is in contact is thereby substantially prevented. However, upon discharge the protective coating is dissipated such that the cell can function.

One of the most common of such fluid depolarizer-/electrolyte solvents is thionyl chloride ($SOCl_2$) which, in combination with lithium, provides a cell couple having an exceedingly high voltage (~4 volts), discharge capability, energy density, and stability of discharge. However, a limiting factor in the utility especially with respect to high rate discharge) of cells containing a $Li/SOCl_2$ couple in the electrolyte salt used therein. Generally an electrolyte salt must fulfill several criteria. It should of course, have a high ionic or electrical conductivity for material transport upon cell discharge. The electrolyte salt should also be highly soluble in the fluid depolarizer/electrolyte whereby such conductivity may be practically attained. Additionally, the electrolyte salt should be stable with respect to both the fluid depolarizer/electrolyte solvent and the anode metal. Electrolyte salts or solutes used in thionyl chloride depolarized cells are, for example, described at length in U.S. Pat. No. 3,926,699. Of the enumerated salts in the aforesaid patent the most preferred and the most widely used electrolyte salt or solute having the above described requisite properties, is lithium tetrachloroaluminate ($LiAlCl_4$). However, under conditions of high rate discharge, the energy density of cells containing lithium tetrachloroaluminate has been found to be substantially reduced.

It is an object of the present invention to provide novel electrolyte salts for non-aqueous electrochemical cells.

It is a further object of the present invention to provide novel electrolyte salts for use in high energy density cells having fluid depolarizer/electrolyte solvents such as thionyl chloride wherein the high rate discharge capability of such cells is improved without substantial loss of capacity.

These and other objects, features and advantages will be more evident from the following discussion.

The present invention generally comprises the use of novel electrolyte salts in high energy density, non-aqueous electrochemical cells. The electrolyte salts have the general formula $M(ZX_4)_n$. "M" represents the alkali or alkaline earth metals such as lithium, sodium, potassium, rubidium, beryllium, magnesium, and calcium, and generally though not necessarily corresponds to the metal used as the anode of the electrochemical cell. "Z" represents [a member selected from the group consisting of] gallium, [indium or thallium,] "X" represents a halogen or mixture of halogens which halogens are chlorine, bromine, iodine and fluorine and "n" represents either 1 or 2 with the value thereof being determined by whether "M" is an alkali metal in which instance n=1 or whether "M" is an alkaline earth metal in which instance n=2.

The preferred electrolyte salts are those in which "X" is chlorine such as lithium tetrachlorogallate, [lithium tetrachloroindate and lithium tetrachlorothallate] with the most preferred salt being lithium tetrachlorogallate.

The anodes useful in high energy density cells containing the novel electrolyte of the present invention include one or more of the aforementioned lithium and other alkali or alkaline earth metals such as sodium, potassium, rubidium, beryllium, magnesium, calcium and other metals above hydrogen in the EMF series.

The novel electrolyte salts of the present invention have particular utility in cells containing fluid depolarizer/electrolyte solvents such as thionyl chloride which cells are capable of being discharged at high rate. Examples of other fluid depolarizer/electrolyte solvents include fluid oxyhalides, non-metallic oxides and non-metallic halides and mixtures thereof such as phosphorous oxychloride ($POCl_3$), selenium oxychloride ($SeOCl_2$), sulfur dioxide ($SO_2$), sulfur trioxide ($SO_3$), vanadium oxytri-chloride ($VOCl_3$), chromyl chloride ($CrO_2Cl_2$), sulfuric oxychloride ($SO_2Cl_2$), Nitryl chloride ($NO_2Cl$), nitrosyl chloride ($NOCl$), nitrogen dioxide ($NO_2$), sulfur monochloride ($S_2Cl_2$) and sulfur monobromide ($S_2Br_2$). Each of the above can be used together with thionyl chloride ($SOCl_2$) as fluid depolarizer/electrolyte solvent or separately.

Though the above electrolyte salts have been described for particular utility in fluid cathode depolarizer/electrolyte solvent cells they may be utilized in other cells requiring electrolyte salts such as those containing solid cathodes such as metal chromates and dichromates, vanadates, molybdates, halides, oxides, permanganates, iodates and carbon monofluoride and organic electrolyte solvents such as tetrahydrofuran, propylene carbonate, dimethyl sulfite, dimethyl sulfoxide, N-nitrosodimethylamine, gamma-butyrolactone, dimethyl carbonate, methyl formate, butyl formate, dimethoxyethane, acetonitrile and N,N-dimethyl formamide.

The salts of the present invention are utilized in the same manner as prior art cells whereby they are simply dissolved in the electrolyte salt solvent to the desired concentration. The following examples, set forth, by way of illustration, the preparation of a salt of the present invention, the testing of its stability with respect to cell components and its performance in electrochemical cells generally and as compared to cells containing an electrolyte salt of the prior art. It is understood that the following examples are for illustrative purposes only with the invention not to be limited thereby.

EXAMPLE I $LiGaCl_4$ is prepared by mixing and melting equimolar amounts of anhydrous $GaCl_3$ and LiCl together. A one molar [$LiGaCl_4$-$SoCl_2$] *$LiGaCl_4$-$SOCl_2$* solution is prepared (with the $LiGaCl_4$ being readily soluble in $SOCl_2$) and the ionic conductivity is measured and is found to be $1.13\times10^{-2}$ $ohm^{-1}$ $cm^{-1}$ at room temperature. This compares favorably with the conductivity of a similar solution of 1 molar $LiAlCl_4$—$SOCl_2$ which is $1.6\times10^{-2}$ $ohm^{-1}$ $cm^{-1}$. The conductivity of $LiGaCl_4$ is thus suitable for a Li/$SOCl_2$ cell with high discharge rate capability.

EXAMPLE II

Shiny pieces of lithium foil are added to the $LiGaCl_4$—$SOCl_2$ solution of Example I and refluxed for 8 days at about 85° C. At the end of the refluxing period the lithium pieces are found to be bright and shiny indicating that the $LiGaCl_4$—$SOCl_2$ is chemically compatible with lithium and is therefore useful as an electrolyte in a lithium anode cell. The absence of discoloration and/or corrosion indicates that a protective coating of sufficient but minimal thickness is formed on the surface of the lithium with discoloration indicating a too thick coating and corrosion indicating the absence of a coating.

EXAMPLE III

Several "D" size cells (OD 1.30", L 2.38") are constructed by winding a lithium anode, having the dimensions of 21.25"×2"×0.015" with a carbon cathode on expanded nickel metal, having the dimensions 20×1.75"×0.025", and two layers of glass fiber paper separators. The cells are each filled with 45 grams of the 1 molar $LiGaCl_4$—$SOCl_2$ solution of Examples I and II. The cells are discharged at various currents with the results given in Table I.

TABLE I

| Cell | Discharge Current | Voltage | amp hours to 2 volts |
|---|---|---|---|
| 1 | 0.13 amps | 3.6 | 14 |
| 2 | 0.10 | 3.5 | 13.4 |
| 3 | 1.0 | 3.3 | 12.4 |
| 4 | 3.0 | 3.0 | 11 |

EXAMPLE IV

Several cells made in accordance with Example III are stored for varying lengths of time at 25° C. and discharged at a current rate of 1 amp with the discharge characteristics as a function of storage time given in Table II.

TABLE II

| Cell | Storage duration at 25° C. (months) | Capacity to 2.0 volts at 1A (amp hours) |
|---|---|---|
| 5 | 0 | 12.5 |
| 6 | 1 | 12.3 |
| 7 | 2 | 11.9 |
| 8 | 5 | 11.0 |

EXAMPLE V (PRIOR ART)

A cell is constructed in accordance with the procedure of Example III but with a 1 molar solution of $LiAlCl_4$—$SOCl_2$ instead of $LiGaCl_4$—$SOCl_2$. The cell is discharged at 3.0 A and delivers 9.0 amp hours with about a 3 volt constant potential.

The 9.0 amp hours attained with a cell containing a $LiAlCl_4$ electrolyte salt is nearly 20% less than that attained under identical conditions with an identical cell containing the electrolyte salt of the present invention.

The above examples are for illustrative purposes only. It is understood that changes and variations with respect to cell components utilized with the electrolyte salts of the present invention may be made without departing from the scope of the present invention as defined in the following claims.

What is claimed is:

1. A non-aqueous electrochemical cell comprising an anode, comprised of one or more metals above hydrogen in the EMF series, a cathode depolarizer and a dissolved electrolyte salt characterized in that the electrolyte salt has the formula $M(ZX_4)_n$ wherein "M" is selected from the group consisting of alkali and alkaline earth metals, "Z" is [selected from the group consisting of] gallium, [indium and thallium,] "X" is selected from the group consisting of chlorine, bromine, iodine, fluorine and mixtures thereof, and "n" is 1 when "M" is an alkali metal and "n" is 2 when "M" is an alkaline earth metal.

2. The cell of claim 1 wherein said cathode depolarizer is a fluid and functions as a solvent for said electrolyte salt.

3. The cell of claim 2 wherein said cathode depolarizer is selected from the group consisting of fluid oxyhalides, non-metallic oxides, non-metallic halides and mixtures thereof.

4. The cell of claim 3 wherein said cathode depolarizer is thionyl chloride ($SOCl_2$).

5. The cell of claim 1 wherein said metal is lithium.

6. The cell of claim 4 wherein said metal is lithium.

[7. The cell of claim 1 wherein said electrolyte salt is selected from the group consisting of lithium tetrachlorogallate, lithium tetrachloroindate and lithium tetrachlorothallate.]

8. The cell of claim 1 wherein said electrolyte salt is lithium tetrachlorogallate.

9. The cell of claim 6 wherein said electrolyte salt is lithium tetrachlorogallate.

*10. A non-aqueous electrochemical cell comprising a lithium anode, a fluid cathode depolarizer and an electrolyte salt dissolved in said fluid cathode depolarizer characterized in that said electrolyte salt consists of $LiGaCl_4$.*

* * * * *